(12) United States Patent
Lim

(10) Patent No.: US 8,881,619 B2
(45) Date of Patent: Nov. 11, 2014

(54) BICYCLE CONTROL DEVICE

(71) Applicant: Shimano (Singapore) Pte. Ltd., Jurong Town (SG)

(72) Inventor: Guang Sheng Elson Lim, Jurong Town (SG)

(73) Assignee: Shimano (Singapore) Pte. Ltd., Jurong Town (SG)

( * ) Notice: Subject to any disclaimer, the term of this patent is extended or adjusted under 35 U.S.C. 154(b) by 75 days.

(21) Appl. No.: 13/724,621

(22) Filed: Dec. 21, 2012

(65) Prior Publication Data

US 2014/0174241 A1 Jun. 26, 2014

(51) Int. Cl.
*F16C 1/10* (2006.01)
*G05G 1/04* (2006.01)
*B62K 23/06* (2006.01)

(52) U.S. Cl.
CPC . *G05G 1/04* (2013.01); *B62K 23/06* (2013.01)
USPC ...................................................... 74/502.2

(58) Field of Classification Search
CPC ................................. G05G 1/04; B62M 25/04
USPC ........ 74/473.13–473.15, 473.3, 501.6, 502.2, 74/504–507
IPC ... B62K 23/02, 23/06; F16C 1/10; B62M 25/04
See application file for complete search history.

(56) References Cited

U.S. PATENT DOCUMENTS

| 7,100,471 B2 | 9/2006 | Irie et al. |
| 7,152,497 B2 | 12/2006 | Sato et al. |
| 7,802,489 B2 * | 9/2010 | Tsumiyama ................. 74/502.2 |
| 7,947,914 B2 * | 5/2011 | Takebayashi et al. ..... 200/61.88 |
| 8,272,293 B2 * | 9/2012 | Miki et al. .................... 74/502.2 |
| 8,297,146 B2 * | 10/2012 | Miki ............................. 74/502.2 |
| 8,485,060 B2 * | 7/2013 | Emura et al. ................ 74/473.14 |
| 8,528,442 B2 * | 9/2013 | Kawakami .................... 74/502.2 |
| 8,661,932 B2 * | 3/2014 | Liao ............................. 74/502.2 |
| 2007/0068312 A1 * | 3/2007 | Sato ............................. 74/502.2 |
| 2013/0233112 A1 * | 9/2013 | Miki et al. ................. 74/473.13 |

* cited by examiner

*Primary Examiner* — Thomas R. Hannon
*Assistant Examiner* — Adam D Rogers
(74) *Attorney, Agent, or Firm* — Global IP Counselors

(57) ABSTRACT

A bicycle control device includes a fixed member, an operating member, a rotatable member, a positioning member and a release member. The positioning member is movably to selectively hold the rotatable member in a plurality of predetermined positions. The release member is movably arranged between a non-releasing position and a releasing position, and moves the positioning member to release the rotatable member. Operating the operating member, the release member moves from the non-releasing position to the releasing position as the operating member moves from a rest position towards a first operated position. The release member moves from the releasing position to the non-releasing position as the operating member moves from the first operated position towards a second operated position. The release member moves from the non-releasing position to the releasing position as the operating member moves from the second operated position towards a third operated position.

10 Claims, 14 Drawing Sheets

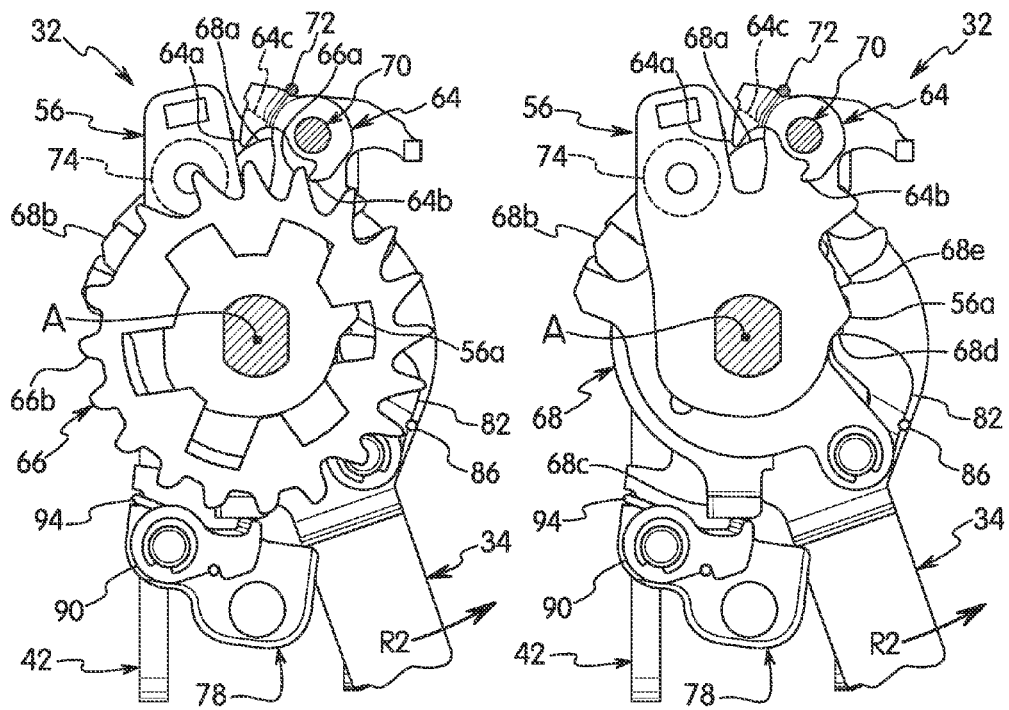
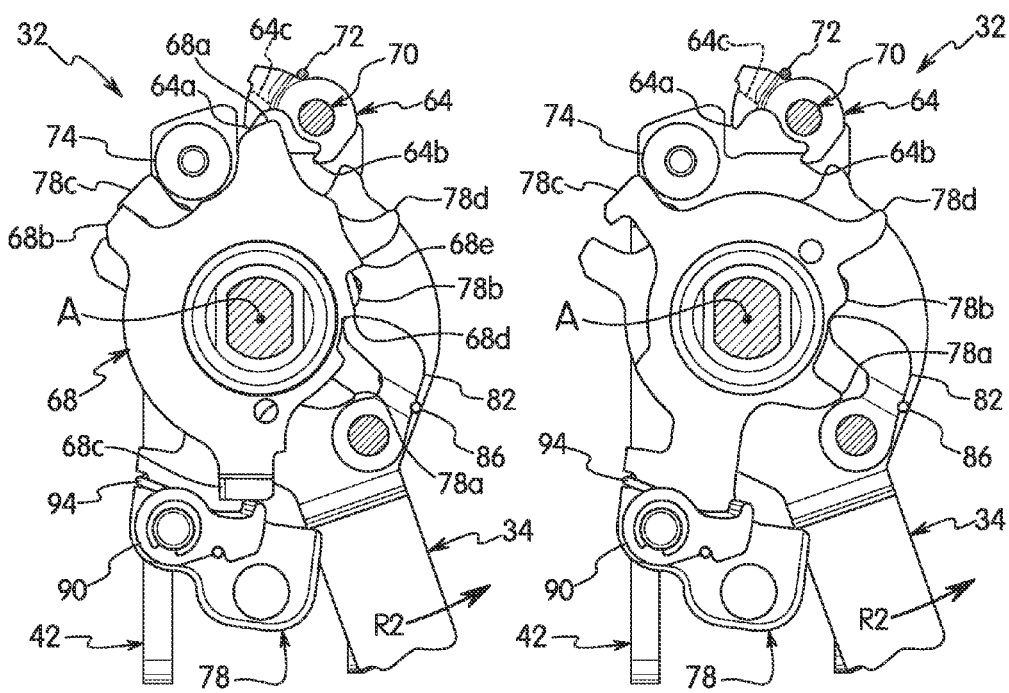

BICYCLE CONTROL DEVICE

BACKGROUND

1. Field of the Invention

This invention generally relates to a bicycle control device. More specifically, the present invention relates to a bicycle control device having an operating member that selectively releases a rotatable member by one or two positions in a single progressive operation of the first operating member.

2. Background Information

In some bicycle control devices such as shifters, a control unit is provided to move a rotatable member in opposite rotational directions and to selectively hold the rotatable member in a predetermined position from among a plurality of distinct predetermined positions. Some control units allow the rider to change the current predetermined position of the rotatable member by one or two positions in response to a single progressive operation of an operating member. One example of such a bicycle control device (i.e., a shifter) is disclosed in U.S. Pat. No. 7,152,497 (assigned to Shimano Inc.). With the shifter of this patent, the rider can release the rotatable member by one or two positions in response to a single progressive operation of the release lever. In the case of a single release operation (i.e., a change of the predetermined position to the next predetermined position) in this patent, the releasing of the rotatable member occurs on the return stroke of the release lever. In other words in the shifter of this patent, the rotatable member does not move during the pushing stoke of the release operation, but rather when the release lever returns to the rest position. Thus, the releasing of the rotatable member does not occur instantly when the release lever is operated.

SUMMARY

Generally, the present disclosure is directed to various features of a bicycle control device. In one feature, a bicycle control device has an operating member that selectively releases a rotatable member by one or two positions in a single progressive release operation of the operating member. Preferably, the rotatable member is released twice during the pushing stoke of the release operation. Thus, the first release of the rotatable member occurs instantly when the operating member is operated from the rest position.

In view of the state of the known technology, a bicycle control device is proposed that basically comprises a fixed member, a first operating member, a rotatable member, a positioning member and a release member. The first operating member is movably arranged with respect to the fixed member. The rotatable member is rotatably mounted to the fixed member in a first rotational direction and a second rotational direction being opposite to the first rotational direction. The positioning member is movably arranged with respect to the fixed member to selectively hold the rotatable member in a plurality of predetermined positions. The release member is movably arranged with respect to the fixed member between a non-releasing position and a releasing position, and moving the positioning member to release the rotatable member for movement from a current one of the predetermined positions in response to operation of the first operating member. In a single progressive operation of the first operating member, the release member moves from the non-releasing position to the releasing position as the first operating member moves from a rest position towards a first operated position. The release member moves from the releasing position to the non-releasing position as the first operating member moves from the first operated position towards a second operated position. The release member moves from the non-releasing position to the releasing position as the first operating member moves from the second operated position towards a third operated position. The second operated position is farther from the rest position than the first operated position. The third operated position is farther from the rest position than the second operated position.

Other objects, features, aspects and advantages of the disclosed bicycle control device will become apparent to those skilled in the art from the following detailed description, which, taken in conjunction with the annexed drawings, discloses a preferred embodiment of the bicycle control device.

BRIEF DESCRIPTION OF THE DRAWINGS

Referring now to the attached drawings which form a part of this original disclosure:

FIG. 20 is a first front view of selected parts of the control unit of the bicycle control device with the first operating member in the first operated position in which the engaging member (i.e., the release pawl) is engaged with the first abutment of the release member and in which the release member is in the releasing position;

FIG. 21 is a second front view of selected parts of the control unit of the bicycle control device with the first operating member in the first operated position in which the release pawl is engaged with the first abutment of the release member and in which the release member is in the releasing position, but with selected parts removed with respect to FIG. 20;

FIG. 22 is a third front view of selected parts of the control unit of the bicycle control device with the first operating member in the first operated position in which the release pawl is engaged with the first abutment of the release member and in which the release member is in the releasing position, but with selected parts removed with respect to FIG. 21;

FIG. 23 is a fourth front view of selected parts of the control unit of the bicycle control device with the first operating member in the first operated position in which the engaging member (i.e., the release pawl) is engaged with the first abutment of the release member and in which the release member is in the releasing position, but with selected parts removed with respect to FIG. 22;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
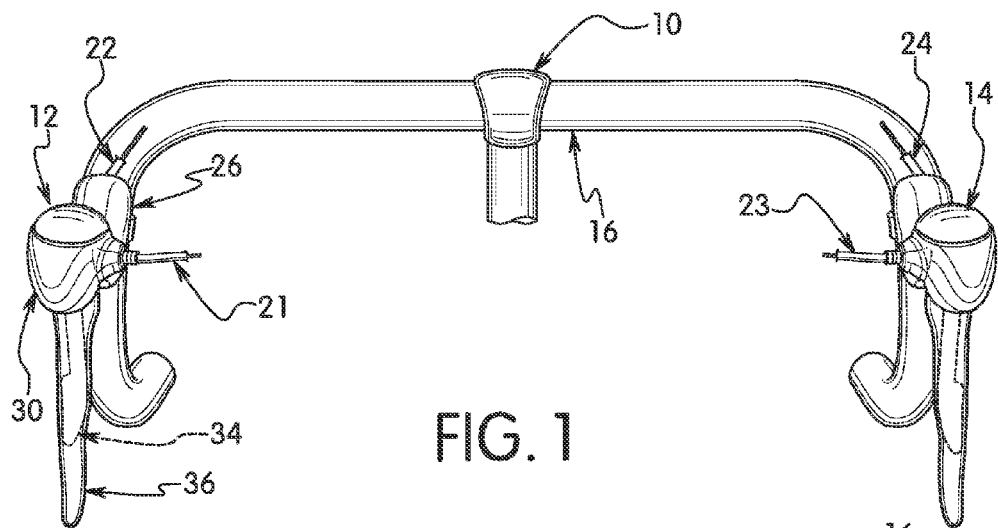
FIG. 1 is a front elevational view of a portion of a bicycle equipped with a pair of bicycle control devices coupled to a drop type handlebar in accordance with one illustrative embodiment.

Referring initially to FIG. 1, a portion of a bicycle 10 is illustrated that is equipped with a pair of bicycle control devices 12 and 14 in accordance with one illustrative embodiment. The bicycle control devices 12 and 14 are mounted on a drop down or drop type handlebar 16 as seen in FIG. 1. The bicycle control device 12 is a right hand shifter (bicycle shift operating device) that is operated by a rider's right hand to operate a first gear shifting device (not shown, e.g., a cable operated rear derailleur) via a control cable 21 and a first brake device (not shown) via a control cable 22. The bicycle control device 14 is a left hand shifter (bicycle shift operating device) that is operated by a rider's left hand to operate a second gear shifting device (not shown, e.g., a cable operated front derailleur) and via a control cable 23 and a second brake device (not shown) via a control cable 24. The bicycle control devices 12 and 14 are parts of a conventional bicycle drive train. For example, in a bicycle drive train using a pair of derailleurs, the bicycle control devices 12 and 14 are used to operate the derailleurs to shift a bicycle chain for changing speeds of the drive train in a relatively conventional manner.

Figures 2, 3:
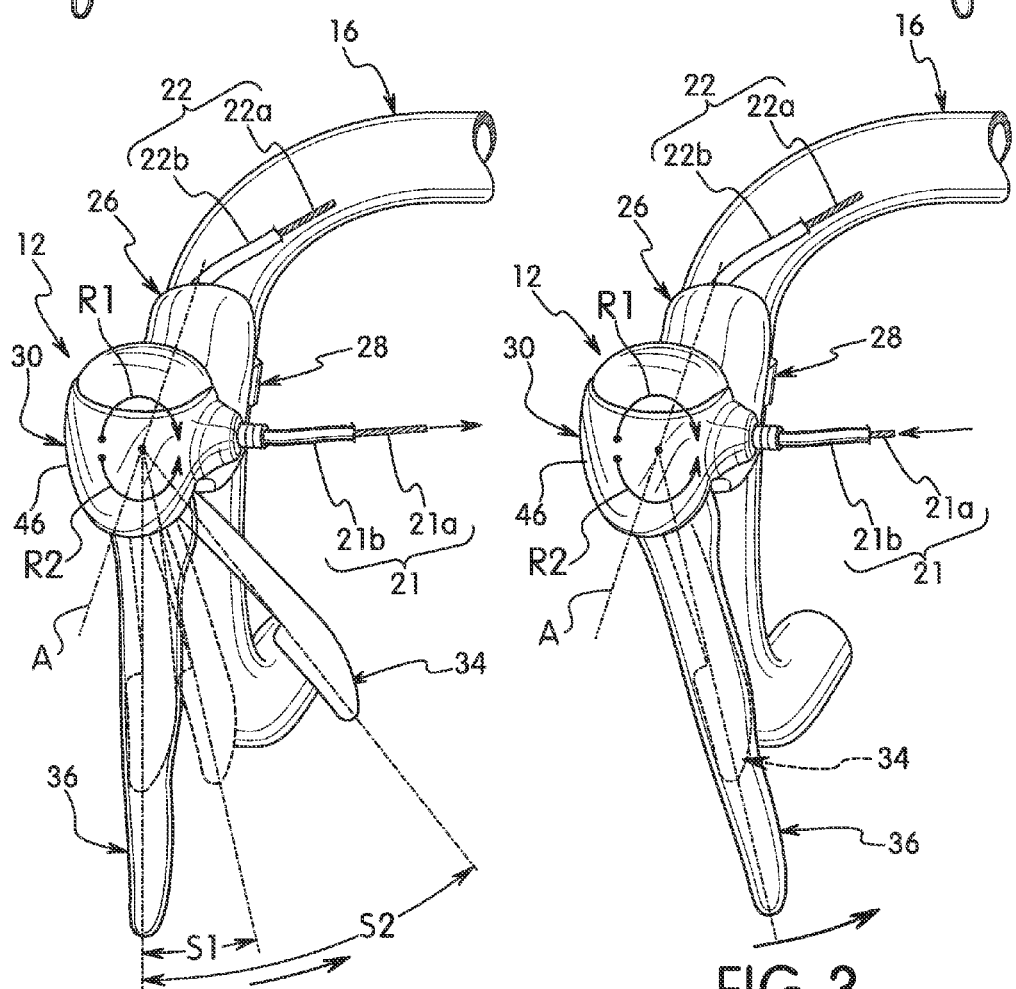
FIG. 2 is a front elevational view of the right hand side of the drop type handlebar with the bicycle control device illustrated in FIG. 1, but with the first operating member moved from the rest position of FIG. 1 to an operated position for performing an instant release of the rotatable member and the second operating member remaining stationary.
FIG. 3 is a front elevational view of the right hand side of the drop type handlebar with the right hand side bicycle control device illustrated in FIG. 1, but with the second operating member moved from the rest position of FIG. 1 to an operated position which caused the first operating member to be moved with the second operating member.
Figure 4:
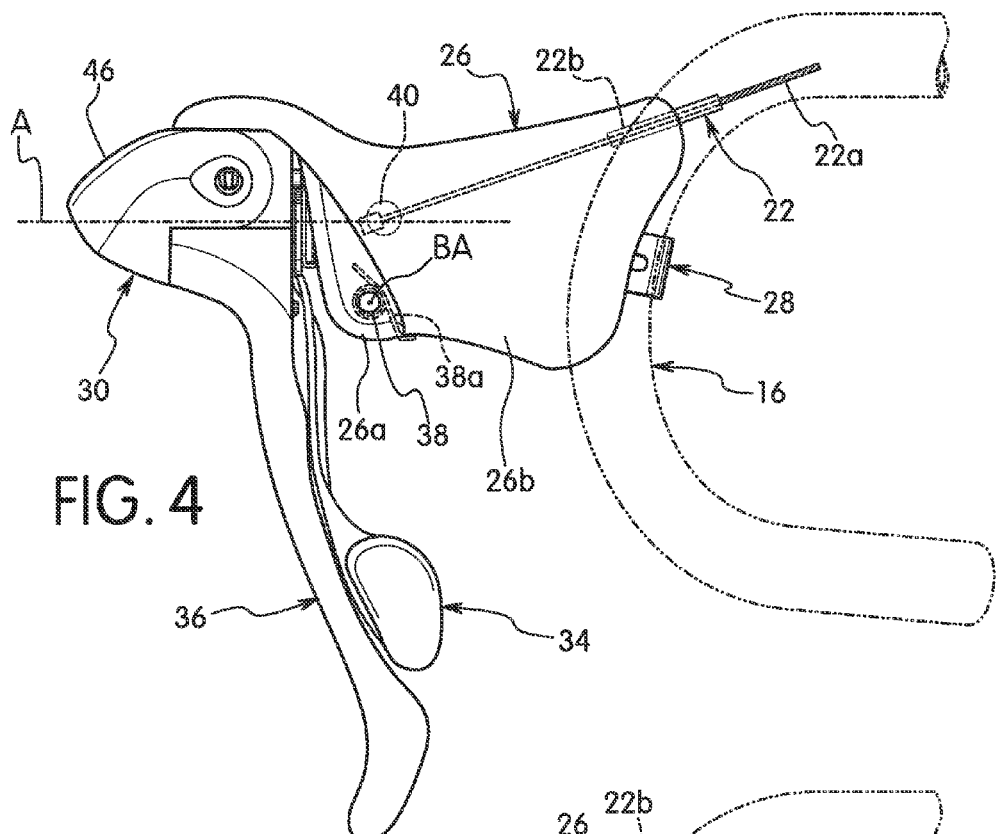
FIG. 4 is an inside elevational view of the bicycle control device illustrated in FIGS. 2 and 3 with the first and second operating members in their rest positions.

Preferably, the control cables 21 to 24 are conventional bicycle operating cables that have an outer case covering an inner wire. In other words, each of the control cables 21 to 24 are Bowden type cables basically include an inner wire slidably received within an outer case. For example, as seen in FIGS. 3 and 4, the shift control cable 21 has an inner wire 21a with an outer case 21b covering the inner wire 21a, while the brake control cable 22 has an inner wire 22a with an outer case 22b covering the inner wire 22a. The inner wire 21a constitutes a connecting member that operatively connects the bicycle control device 12 to the first gear shifting device for shifting the first gear shifting device in response to operation of the bicycle control device 12.

In the illustrated embodiment, the bicycle control devices 12 and 14 are essentially identical in operation, except that they are mirror images of each other and they may have a different number of shift operations. In other words, the bicycle control device 14 is substantially identical to the bicycle control device 12, except for the shifting or control unit (not shown) of the bicycle control device 14 has been modified to be a mirror image and to decrease the number of gears that can be shifted. Thus, only the bicycle control device 12 will be discussed and illustrated herein.

As seen in FIGS. 2 to 4, the bicycle control device 12 includes a bracket or base member 26 that is fixedly mounted to one of the curved portions of the drop down handlebar 16 by a handlebar mounting structure 28 (e.g. a conventional band clamp as shown) the base member 26 is fixed to the drop down handlebar 16 by the handlebar mounting structure 28, the base member 26 constitutes a stationary member. Riders sometimes grip the base member 26 and lean on the base member 26 during riding. It is desirable to provide a comfortable feeling for the rider's hand while the rider is gripping the base member 26. Thus, the base member 26 has a rigid main body 26a and a soft outer elastomeric grip cover 26b. The grip cover 26b partially covers the main body 26a as seen in FIG. 4. In particular, the grip cover 26b is stretched over a gripping portion of the main body 26a. Typically, the main body 26a is made of a rigid plastic material. The handlebar mounting structure 28 is preferably a conventional band clamp or similar structure that is used in a road shifter for mounting to a drop down style handlebar such as the drop down handlebar 16. Thus, the base member 26 and the handlebar mounting structure 28 are conventional structures, and thus, they will not be discussed in detail herein. For example, a base member and a handlebar mounting structure similar to the base member 26 and the handlebar mounting structure is disclosed in U.S. Pat. No. 7,100,471, which is assigned to Shimano Inc.

Figure 6:
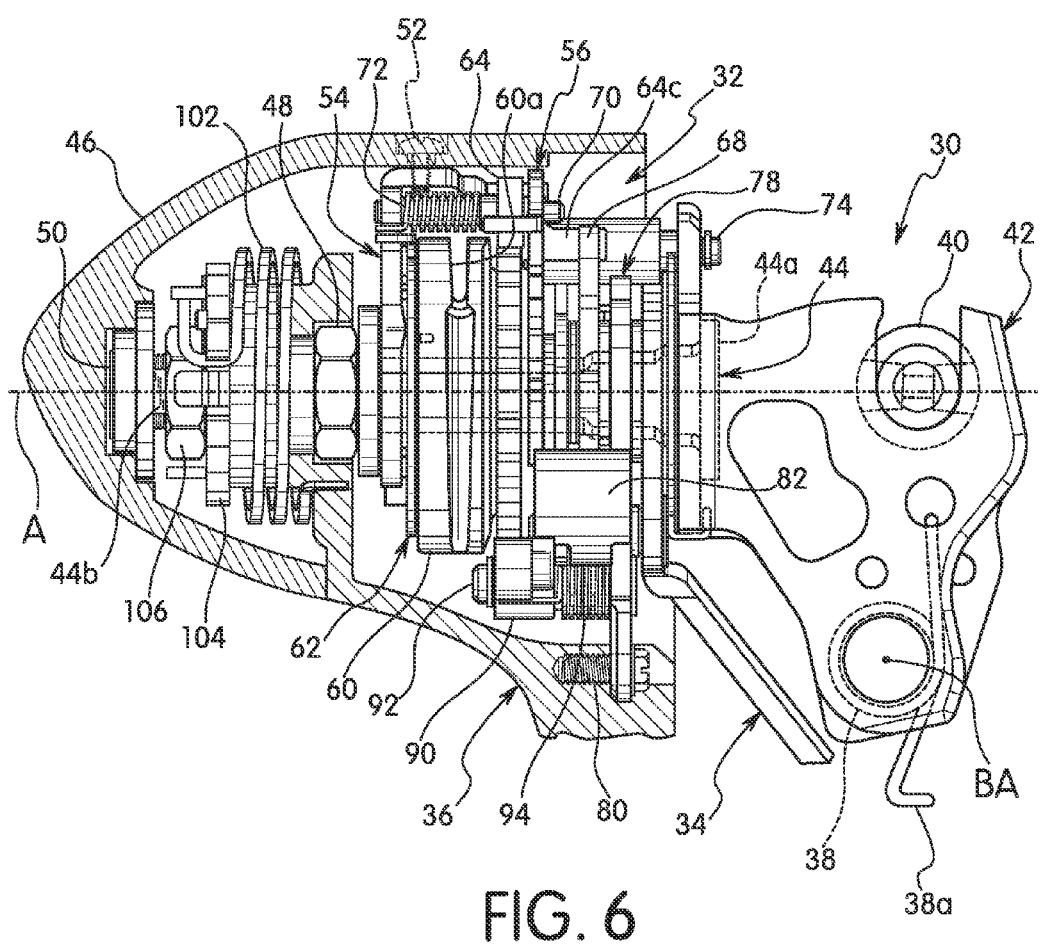
FIG. 6 is a cross sectional view of selected parts of the bicycle control device illustrated in FIGS. 2 to 5 taken along a vertical center plane of the bicycle control device with the control unit shown in elevation.
Figure 7:
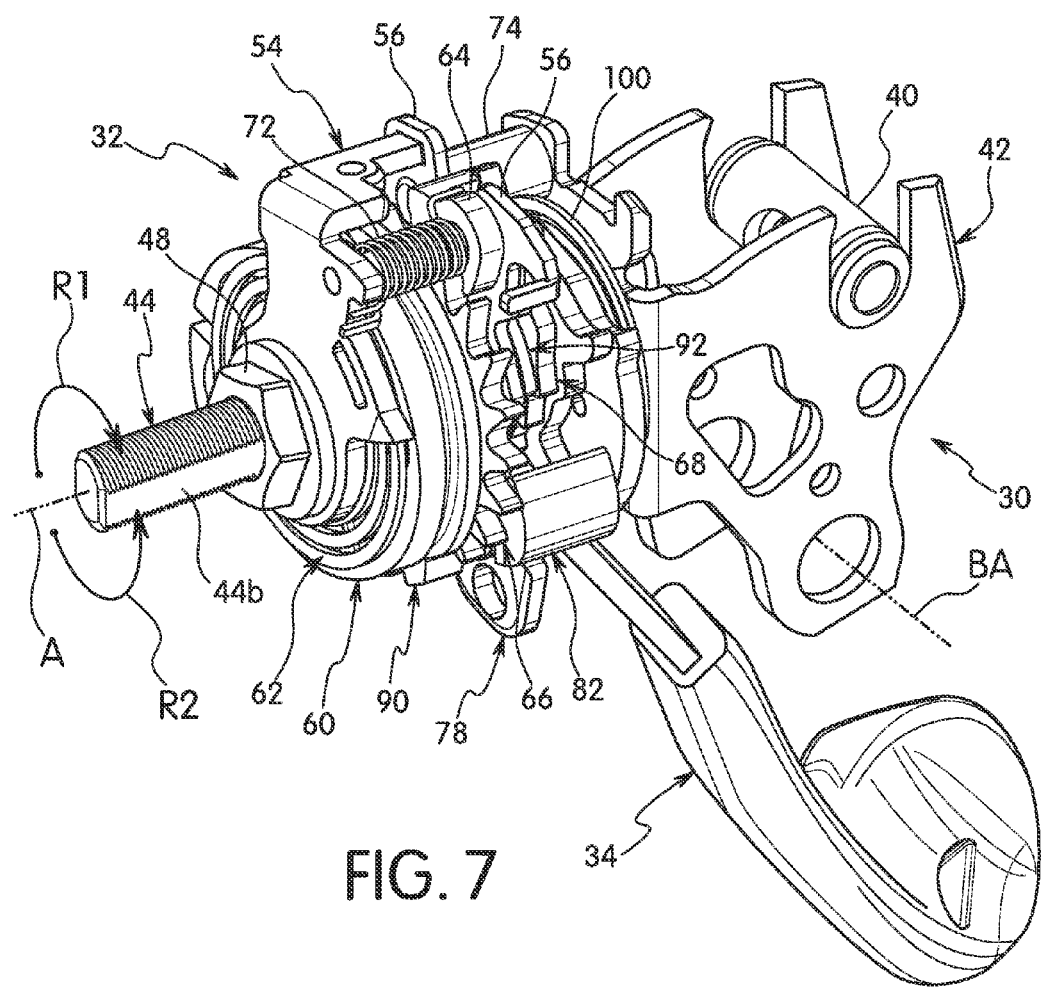
FIG. 7 is a front perspective view of selected parts of the control unit of the bicycle control device illustrated in FIGS. 2 to 5.

In this illustrative embodiment, as best seen in FIGS. 6 and 7, the bicycle control device 12 further includes a support structure 30 and a shift control unit (hereinafter control unit) 32. The support structure 30 supports the control unit 32 on the base member 26 as discussed below. Thus, the support structure 30 constitutes a fixed member with respect to the control unit 32. Of course, it will be apparent from this disclosure that the fixed member is not limited to the support structure 30 of the illustrated embodiment. Moreover, each of the parts of the support structure 30 can be individually considered to be a fixed member with respect to the control unit 32. In other words, the parts of the bicycle control device 12 that are stationary with respect to the parts of the control unit 32 are each considered to be a fixed member.

Figure 5:
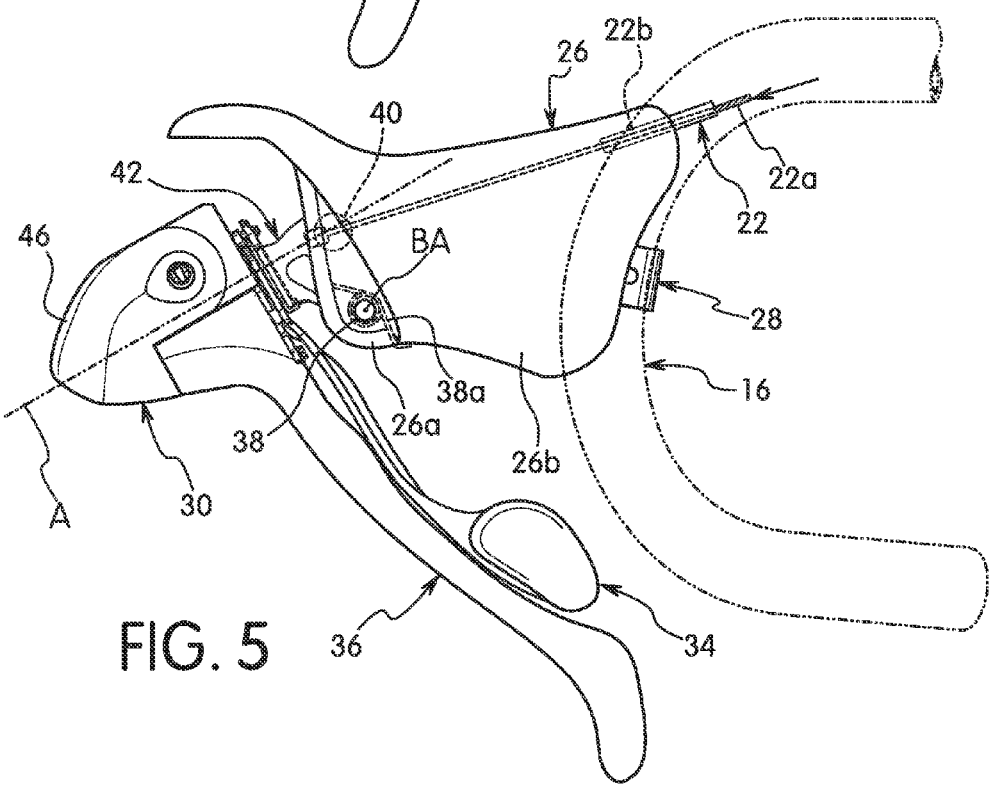
FIG. 5 is an inside elevational view of the bicycle control device illustrated in FIGS. 2 to 4, but with the second operating member pivoted to a braking position which caused the first operating member to be moved with the second operating member about the braking pivot axis.

In this illustrated embodiment, the control unit 32 is provided with a first (user) operating member 34 and a second (user) operating member 36 for operating the control unit 32 to release and pull the inner wire 21a of the shift control cable 21. In this illustrated embodiment, the first operating member 34 only performs a shifting operation (FIG. 2), while the second operating member 36 is used to perform both a shifting operation (FIG. 3) and a braking operation (FIG. 5). Thus, the bicycle control device 12 is sometimes called a road "brifter".

While the first and second operating members 34 and 36 are illustrated as first and second user operating levers, the operating members of the bicycle control device 12 are not limited to operating levers. Moreover, the control unit 32 could be modified to be operated by a single operating member. However, using a single operating member may increase the complexity of the control unit 32.

As explained later, the first and second operating members 34 and 36 are operatively coupled to the control unit 32 for performing shifting operations in a gear shifting device to change gears (i.e., shifting a chain between the gears). Also as explained later, the first and second operating members 34 and 36 are preferably both pivoted relative to the main body 26a of the base member 26 in a direction towards a bicycle longitudinal center plane for performing shifting operations.

In this illustrative embodiment, the control unit 32 is mounted on the support structure 30 such that the support structure 30 and the control unit 32 are an integrated unit that is attached to the main body 26a of the base member 26. In particular, as seen in FIG. 5, the support structure 30 is pivotally mounted on the base member 26 by a pivot pin 38 such that the support structure 30 and the control unit 32 pivot relative to the base member 26 about a braking pivot axis BA. The support structure 30 and the control unit 32 biases to a rest position as seen in FIG. 4 by a torsion spring 38a. The torsion spring 38a has its coiled portion disposed on the pivot pin 38 and opposite free ends engaged with the main body 26a and the support structure 30 in a conventional manner such as the arrangement disclosed in U.S. Pat. No. 7,100,471, which is assigned to Shimano Inc.

The support structure 30 includes a brake cable attachment structure 40 for attaching the inner wire 22a of the brake control cable 22 thereto. In particular, the inner wire 22a of the brake control cable 22 passes through a bore of the main body 26a of the base member 26, and is attached to the brake cable attachment structure 40 of the support structure 30. The outer case 22b of the brake control cable 22 contacts the main body 26a of the base member 26 such that the inner wire 22a of the brake control cable 22 slides within the outer case 22b as the first operating member 34 is pivoted on the pivot pin 38 about the braking pivot axis BA to perform a braking operation.

In this illustrated embodiment, as seen in FIG. 6, the support structure 30 further includes a bracket or main support 42, a mounting axle 44 and a housing 46. The support structure 30 also includes other parts located on the mounting axle 44 as discussed below. The main support 42 is pivotally mounted on the main body 26a of the base member 26 by the pivot pin 38 such that the support structure 30 and the control unit 32 pivot relative to the base member 26 about the braking pivot axis BA as seen in FIG. 5. The control unit 32 is mounted on the mounting axle 44 of the support structure 30. The mounting axle 44 defines a first axis A of the control unit 32.

Figure 8:
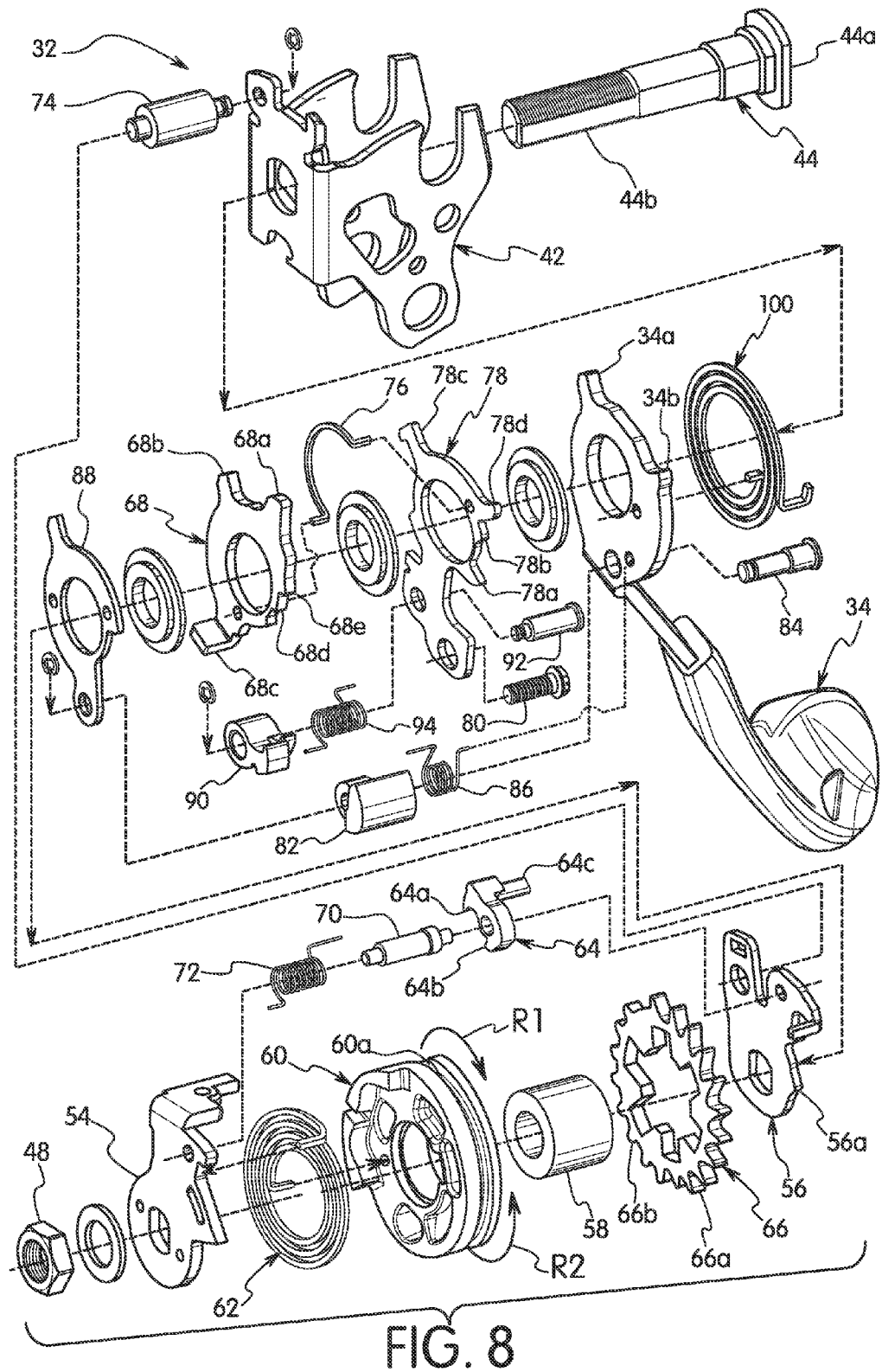
FIG. 8 is an exploded perspective view of the main parts of the control unit of the bicycle control device illustrated in FIG. 7.

Basically, as seen in FIGS. 7 and 8, the mounting axle 44 is a bolt that has a head 44a and a non-circular shaft 44b that is partially threaded. The threaded shaft 44b passes through a non-circular opening of the main support 42 and through the control unit 32. Thus, the main support 42 is non-rotatably supported on the mounting axle 44. A nut 48 is screwed onto the shaft 44b to secure the control unit 32, the first operating member 34, the second operating member 36 and the main support 42 on the shaft 44b between the head 44a and the nut 48.

As seen in FIG. 6, the housing 46 is also non-rotatably mounted to the mounting axle 44 by mating with a cap 50 of the support structure 30, which is non-rotatably disposed on the end of the shaft 44b, and a fastener 52 (e.g., a screw as shown). Basically, the housing 46 covers a portion of the control unit 32. The housing 46 is preferably a one-piece, unitary member that is made of a suitable rigid material such as a hard plastic material.

Referring mainly to FIGS. 6 to 10, the control unit 32 will now be discussed in more detail. The support structure 30 further includes a first stationary support plate 54 and a second stationary support plate 56 for mounting certain parts of the control unit 32 on the mounting axle 44. A spacer 58 is located on the shaft 44b between the first and second stationary support plates 54 and 56 to provide the appropriate space for the parts of the control unit 32 that are located between the first and second stationary support plates 54 and 56. The spacer 58 also acts as a bushing to rotatable support certain parts of the control unit 32 that are located between the first and second stationary support plates 54 and 56. In particular, the first and second stationary support plates 54 and 56 have non-circular openings that mate with a non-circular portion of the shaft 44b of the mounting axle 44. Thus, the first and second stationary support plates 54 and 56 are stationary members with respect to the control unit 32. The second stationary support plate 56 is provided with a disengaging abutment 56a that will be discussed below.

Preferably, the control unit 32 further includes a rotatable member or spool 60 is located on the mounting axle 44 between the first and second stationary support plates 54 and 56. In particular, the rotatable member 60 is rotatably mounted on the mounting axle 44 to rotate relative to the first and second stationary support plates 54 and 56 of the support structure 30 in response to operation of the first and second operating members 34 and 36. In other words, the first and second operating members 34 and 36 are operatively coupled to the control unit 32 for performing shifting operations in a gear shifting device to change gears (i.e., shifting a chain between the gears). In this illustrated embodiment, the first and second operating members 34 and 36 are movably arranged with respect to the mounting axle 44 of the support structure 30 to pivot on the mounting axle 44 that defines the first axis A. As best seen in FIGS. 2 and 3, the first and second operating members 34 and 36 are both pivotally operated to pivot on the mounting axle 44 from their rest positions in a same direction (i.e., in a direction towards a bicycle longitudinal center plane) to perform shifting operations.

Figure 9:
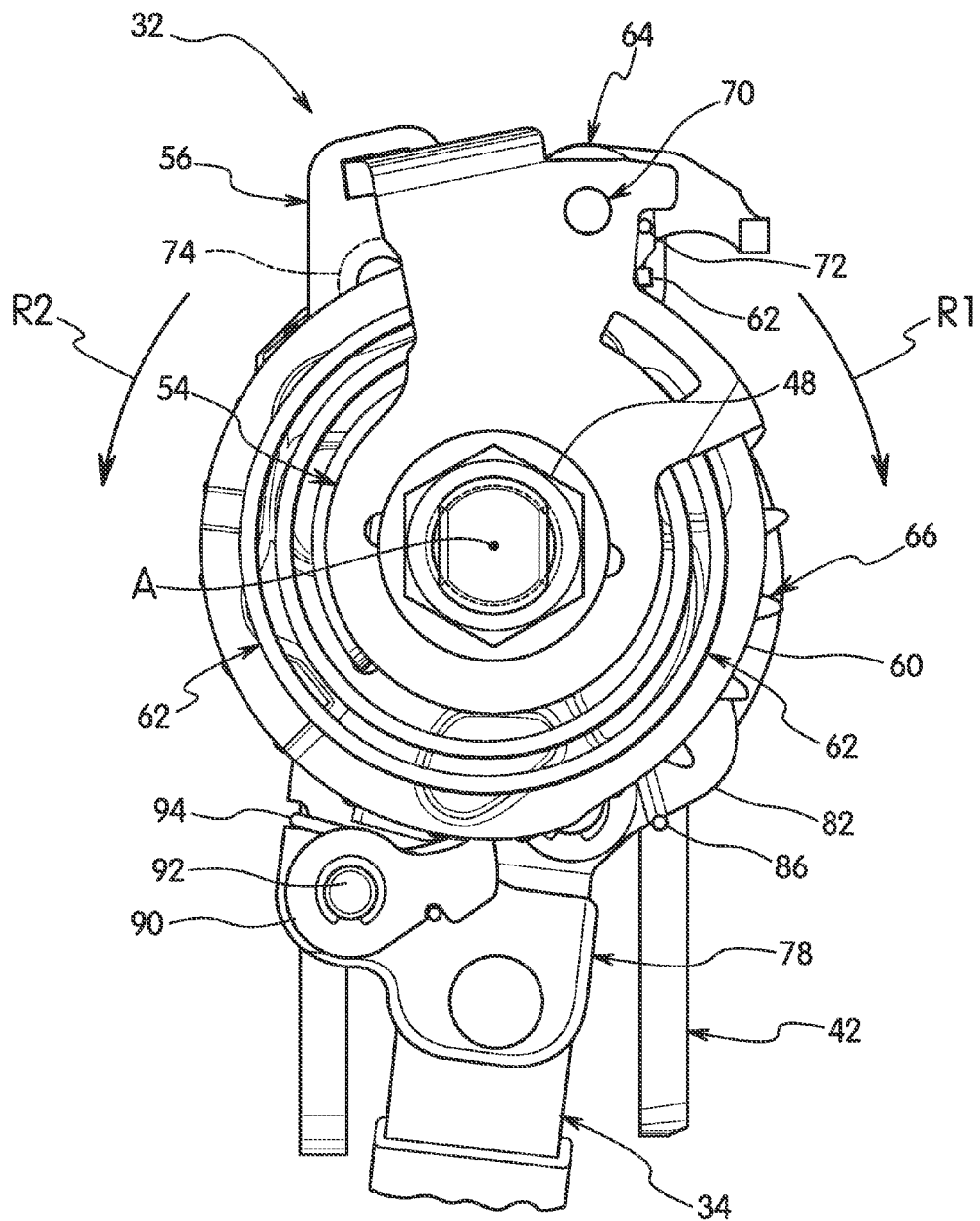
FIG. 9 is a front view of the control unit of the bicycle control device illustrated in FIGS. 7 and 8, as viewed along the main axle.

As seen in FIG. 9, the rotatable member 60 is rotatably mounted to the support structure 30 in a first direction R1 about the first axis A in response to operation of the first operating member 34 from a rest position (FIG. 1) to operated positions (FIG. 2). The rotatable member 60 is further rotatably mounted to the support structure 30 in a second direction R2, which is opposite to the first direction R1, about the first axis A in response to operation of the second operating member 36 from a rest position (FIG. 1) to an operated position (FIG. 3).

As seen in FIGS. 6 and 8, the rotatable member 60 has a conventional wire attachment structure 60a that includes an opening or recess for receiving the inner wire 21a and engaging an end nipple or barrel that is secured to one end of the inner wire 21a. The rotatable member 60 releases the inner wire 21a relative to the support structure 30 in response to operation of the first operating member 34, and pulls the inner wire 21a relative to the support structure 30 in response to operation of the second operating member 36. Thus, the rotatable member 60 is also known as a wire take-up member or a cable spool, since the inner wire 21a is released or pulled as the rotatable member 60 rotates in response to operation of the first and second operating members 34 and 36.

Preferably, a biasing member 62 biases the rotatable member 60 to the first direction R1. In particular, the biasing member 62 is operatively connected between the rotatable member 60 and the first stationary support plate 54, which is non-rotatably mounted on the mounting axle 44 of the support structure 30. In the illustrated embodiment, the biasing member 62 is a torsion spring having its coiled portion disposed on the mounting axle 44 with its first free end disposed in a hole in the rotatable member 60 and its second free end hooked onto the first stationary support plate 54 of the support member 30. The threaded shaft 44b passes through a non-circular opening of the first stationary support plate 54 so that the first stationary support plate 54 is non-rotatably supported on the mounting axle 44.

Preferably, the control unit 32 further includes a positioning member 64, a pulling member 66 and a release member 68. The positioning member 64 is pivotally mounted on a pin 70 that is supported between the first and second stationary support plates 54 and 56. In the illustrated embodiment, the pulling member 66 is a ratchet plate that is non-rotatably fixed to the rotatable member 60 as an integrated unit in a conventional manner (i.e., a non-circular projection of the rotatable member 60 mates with the non-circular recess of the pulling member 66). Thus, the rotatable member 60 and the pulling member 66 are rotatably mounted to the support structure 30 on the mounting axle 44 that defines the first axis A. Alternatively, the rotatable member 60 and the pulling member 66 can be integrally formed as a one-piece, unitary member. Thus, each of the parts of the pulling member 66 can be considered to be a part of the rotatable member 60.

Preferably, the positioning member 64 is a positioning pawl that cooperates with the pulling member 66 of the rotatable member 60 to selectively maintain the rotatable member 60 in the plurality of predetermined positions. In other words, the positioning member 64 is movably arranged with respect to the support structure 30 to selectively hold the rotatable member 60 in the plurality of predetermined positions by engaging the pulling member 66 of the rotatable member 60. In particular, the positioning member 64 includes a position maintaining tooth 64a, a stop tooth 64b and an actuation abutment 64c. The positioning member 64 is moved by the release member 68 during a release operation to release the rotatable member 60 and the pulling member 66 in the first direction R1 for shifting one or two of the predetermined (gear) positions. A biasing member 72 is provided on the pin 70 to bias the positioning member 64 towards engagement with the pulling member 66 on the rotatable member 60. The position maintaining tooth 64a of positioning member 64 is engaged with the pulling member 66 while parts of the bicycle control device 12 are all in their rest positions. The coil portion of the biasing member 72 is disposed on the pin 70, while a first end of the biasing member 72 is hooked on the first stationary support plate 54 and a second end of the biasing member 72 is hooked on the positioning member 64.

Preferably, the release member 68 is movably arranged with respect to the support structure 30 to move between a non-releasing position and a releasing position. Basically, when the release member 68 is moved to the releasing position, the release member 68 moves the positioning member 64 to release the rotatable member 60 for movement from a current one of the predetermined positions in response to operation of the first operating member 34. In this way, the release member 68 engages the positioning member 64 to release the rotatable member 60 for rotational movement in the first direction R1. The rotatable member 60 and the release member 68 are rotatably mounted on the mounting axle 44 that defines the first axis A. Also the release member 68 rotates relative to the rotatable member 60 for disengaging the positioning member 64 from the rotatable member 60.

In this illustrated embodiment, the release member 68 moves from the non-releasing position to the releasing position as the first operating member 34 is moved from the rest position (FIG. 1) by an amount S1 (FIG. 2) to rotate the rotatable member 60 by a single gear position. However, if the first operating member 34 is moved from the rest position (FIG. 1) by an amount S2 (FIG. 2), then the rotatable member 60 rotates two gear positions. In particular, by moving the first operating member 34 by the amount S2, the release member 68 initially moves from the non-releasing position to the releasing position, and then the release member 68 returns to the non-releasing position, without the first operating member 34 being moved in the first direction R1. Then, further movement of the first operating member 34 in the second direction R2 from this intermediate position causes the release member 68 to again move from the non-releasing position to the releasing position without the first operating member 34 being removed in the first direction R1.

The pulling member 66 is preferably a positioning and pulling ratchet having a plurality of positioning teeth 66a and a plurality of pulling teeth 66b. Here, the pulling member 66 is a ratchet plate with the positioning teeth 66a and the pulling teeth 66b formed on its peripheral edge. The pulling member 66 is fixedly attached to the rotatable member 60. Thus, the second operating member 36 is operatively engaged with the rotatable member 60, via the pulling member 66, to rotate the rotatable member 60 in the second direction R2 as the second operating member 36 is operated from the rest position.

With the bicycle control device 12 in the rest position, the position maintaining tooth 64a of the positioning member 64 is engaged with one of the positioning teeth 66a to maintain the rotatable member 60 in one of the predetermined (gear) positions. In the illustrated embodiment, the release member 68 is a plate having a peripheral edge that defines a release abutment 68a, a stop abutment 68b, a pull pawl moving abutment 68c, a first abutment 68d and a second abutment 68e. The release abutment 68a moves the positioning member 64 as the release member 68 rotates relative to the rotatable member 60 alternately between the non-releasing position and the releasing position. The stop abutment 68b contacts a stop pin 74 while the release member 68 is in the rest position. The stop pin 74 is supported between the main support 42 and the second stationary support plate 56.

The stop pin 74 also controls the range of movement of the first operating member 34. In particular, the first operating member 34 includes a first stopping abutment 34a and a second stopping abutment 34b. As explained later, the first operating member 34 is biased against the stop pin 74 to establish the rest position of the first stopping abutment 34a. The second stopping abutment 34b abuts the stop pin 74 to limit pivotal movement of the first operating member 34 in the second direction R2 about the first axis A from the rest position.

During a release operation, the first operating member 34 is moved in the second direction R2 which causes the release member 68 to also rotate in the second direction R2. This rotational movement of the release member 68 causes the release abutment 68a of the release member 68 to contact the actuation abutment 64c of the positioning member 64 and pivots the positioning member 64. This pivotal movement of the positioning member 64 causes the position maintaining tooth 64a to be disengaged from the positioning teeth 66a of the pulling member 66. However, as the position maintaining tooth 64a moves towards disengagement from the positioning teeth 66a of the pulling member 66, the stop tooth 64b moves into the path of the positioning teeth 66a of the pulling member 66 to limit rotational movement of the rotatable member 60 by catching one of the positioning teeth 66a of the pulling member 66.

A biasing member 76 is provided to bias the release member 68 against the stop pin 74 to establish a rest position of the release member 68. In particular, the biasing member 76 is provided between the release member 68 and an attachment plate 78 that partially supports the second operating member 36 on the mounting axle 44. In particular, a first end of the biasing member 76 is located in a hole in the release member 68, and a second end of the biasing member 76 is located in a hole in the attachment plate 78. The attachment plate 78 has a first end rotatably supported on the mounting axle 44 and a second end secured to the second operating member 36 by a screw 80 or other suitable fastener. Thus, the attachment plate 78 is effectively a part of the second operating member 36, and pivots with the second operating member 36.

The attachment plate 78 includes a first disengaging abutment 78a, a second disengaging abutment 78b, a first stopping abutment 78c and a second stopping abutment 78d. The first and second engagement abutments 78a and 78b will be discussed later. The first and second stopping abutments 78c and 78d abut the stop pin 74 to control the range of movement of the second operating member 36. In particular, the first stopping abutment 78c contacts the stop pin 74 to define the rest position of the second operating member 36. The second stopping abutment 78d contacts the stop pin 74 when the second operating member 36 is pivoted in the second direction R2 from the rest position about the first axis A to limit the range of movement of the second operating member 36.

Basically, the positioning member 64 maintains the rotatable member 60 in a plurality of predetermined positions (i.e., a plurality of predetermined gear positions in the case of the control unit 32) by engaging the pulling member 66 as explained later. Of course, if the bicycle control device 12 was not a shifter, then the predetermined positions would be predetermined setting positions of a bicycle component that would be operated by a bicycle control device constructed in accordance with the teachings of this disclosure.

The position maintaining tooth 64a contacts one of the positioning teeth 66a while the parts of the control unit 32 are in their rest positions to maintain the rotatable member 60 in one of the predetermined positions. The stop tooth 64b engages one of the positioning teeth 66a during a release operation so that the rotatable member 60 and the pulling member 66 move only one gear position at a time, and so that the rotatable member 60 does not completely rotate to its end position. In particular, when the release member 68 is rotated in the second direction R2, the release abutment 68a of the release member 68 engages the actuation abutment 64c of the positioning member 64 to pivot the positioning member 64 so that the position maintaining tooth 64a disengages from the positioning teeth 66a to release the rotatable member 60 in the first direction R1. However, this pivoting of the positioning member 64 causes the stop tooth 64b to move into the path of the positioning teeth 66a to catch one of the positioning teeth 66a and prevent further rotation of the rotatable member 60 in the first direction R1.

Preferably, the control unit 32 further includes an engaging member 82 for rotating the release member 68 in the second direction R2 in response to operation of the first operating member 34. Basically, the engaging member 82 is operatively coupled to the first operating member 34 to engage the release member 68 such that the engaging member 82 moves the release member 68 as the first operating member 34 is operated from the rest position in the second direction R2. In the illustrated embodiment, a mounting pin 84 movably supports the engaging member 82 on the first operating member 34. The engaging member 82 is preferably a release pawl that is pivotally mounted on the first operating member 34 by the mounting pin 84 to move the release member 68 between the non-releasing position and the releasing position in response to operation of the first operating member 34. A biasing member 86 (i.e., a torsion spring in this embodiment) biases the engaging member 82 towards engagement with the release member 68. However, while the first operating member 34 and the release member 68 are both in the rest positions, the engaging member 82 engages the first disengaging abutment 78a of the attachment plate 7 to hold the engaging member 82 out of engagement with the release member 68. Moreover, the second disengaging abutment 78b of the attachment plate 78 also moves and holds the engaging member 82 out of engagement with the release member 68 when the first operating member 34 is partially operated to complete a first instant release operation.

In the illustrated embodiment, the control unit 32 further includes support plate 88 which is pivotally mounted on the mounting axle 44. The mounting pin 84 is attached to the support plate 88 such that the support plate 88 moves with the first operating member 34 as the first operating member 34 is moved. In this way, the both ends of the mounting pin 84 are supported, and the position of the engaging member 82 is properly maintained.

Preferably, the control unit 32 further includes a pulling pawl 90 for rotating the rotatable member 60 in the second direction R2 in response to operation of the second operating member 36. In the illustrated embodiment, the pulling pawl 90 is movably mounted on the attachment plate 78 by a mounting pin 92. The pulling pawl 90 is biased towards engagement with the pulling member 66 by a spring 94. In particular, the pulling pawl 90 selectively engages one of a plurality of pulling teeth 66b of the pulling member 66, which is fixed to the rotatable member 60, as the second operating member 36 connected to the attachment plate 78 is pivoted in the second direction R2. A pulling or winding operation of the rotatable member 60 using the second operating member 36 is illustrated in FIG. 10.

Figure 10:
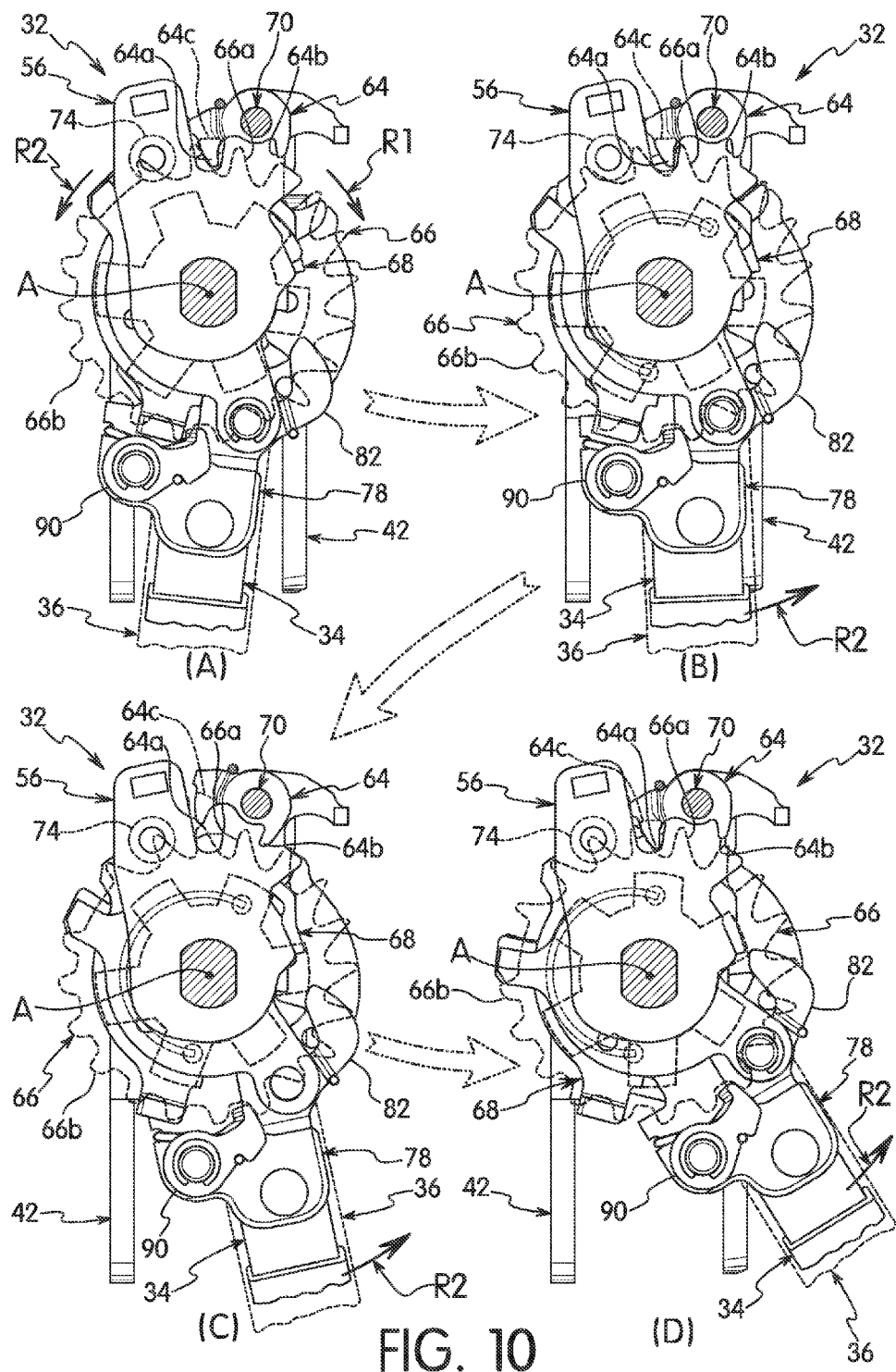
FIG. 10 is a series of front views of selected parts of the control unit of the bicycle control device illustrated in FIGS. 7 to 9, as viewed along the main axle, and showing a pull operation of the rotatable member.

As seen in FIG. 10, as the second operating member 36 is initially moved from the rest position (part (A) of FIG. 10) in the second direction R2, the tooth of the pulling pawl 90 engages one of the pulling teeth 66b of the pulling member 66 as seen in part (B) of FIG. 10. Further movement of the second operating member 36 in the second direction R1 causes the rotatable member 60 and the pulling member 66 to rotate in the second direction R2 as seen in part (C) of FIG. 10. Also as seen in part (C) of FIG. 10, this further movement also causes the positioning member 64 to pivot such that the position maintaining tooth 64a disengages from one of the positioning teeth 66a that was currently engaged. As seen in part (D) of FIG. 10, once the position maintaining tooth 64a has completely disengaged the positioning teeth 66a that was currently engaged, the positioning member 64 is pivoted back into the path of the positioning teeth 66a. In this way, the position maintaining tooth 64a engages the next adjacent one of the positioning teeth 66a. Depending on the position of the second stopping abutment 78d (FIG. 8), the second operating member 36 can be limited to a single shift in a single progressive movement of the second operating member 36 from the rest position to the fully operated end position, or can be perform two or more shifts in a single progressive movement of the second operating member 36 from the rest position to the fully operated end position.

In the illustrative embodiment, the first operating member 34 is a trigger type operating lever that is biased to the rest position in a conventional manner. In particular, as seen in FIGS. 6 to 8, a first return spring or biasing member 100 is provided between the first operating member 34 and the main support 42 to bias the first operating member 34 to its rest position. The first return spring 100 is a torsion spring having its coiled portion disposed on the mounting axle 44 with its first free end contacting the first operating member 34 and its second free end hooked on the main support 42 of the support member 30. Thus, the first return spring 100 biases the first operating member 34 in the first direction R1 about the first axis A such that the first stopping abutment 34a contacts the stop pin 74 to establish the rest position of the first operating member 34.

In the illustrative embodiment, the second operating member 36 is also a trigger type operating lever that is biased to the rest position in a conventional manner. The second operating member 36 is movably arranged with respect to the support structure 30. As seen in FIG. 6, a second return spring or biasing member 102 is provided between the second operating member 36 and a third stationary support plate 104 that is included in the support structure 30 and non-rotatably disposed on the mounting axle 44. The second return spring 102 biases the second operating member 36 to its rest position. In the illustrated embodiment, the second return spring 102 is a torsion spring having its coiled portion disposed on the mounting axle 44 with its first free end disposed in a hole in the second operating member 36 and its second free end hooked onto the third stationary support plate 104 of the support member 30. Thus, the second return spring 102 biases the second operating member 36 in the first direction R1 about the first axis A such that the first stopping abutment 78c contacts the stop pin 74 to establish the rest position of the second operating member 36.

The second return spring 102 and the third stationary support plate 104 are disposed on the mounting axle 44 near the free tip end of the shaft 44b between the second operating member 36 and the housing 46. A nut 106 is screwed onto the shaft 44b of the mounting axle 44 to retain the second return spring 102 and the third stationary support plate 104 on the mounting axle 44.

Figure 11:
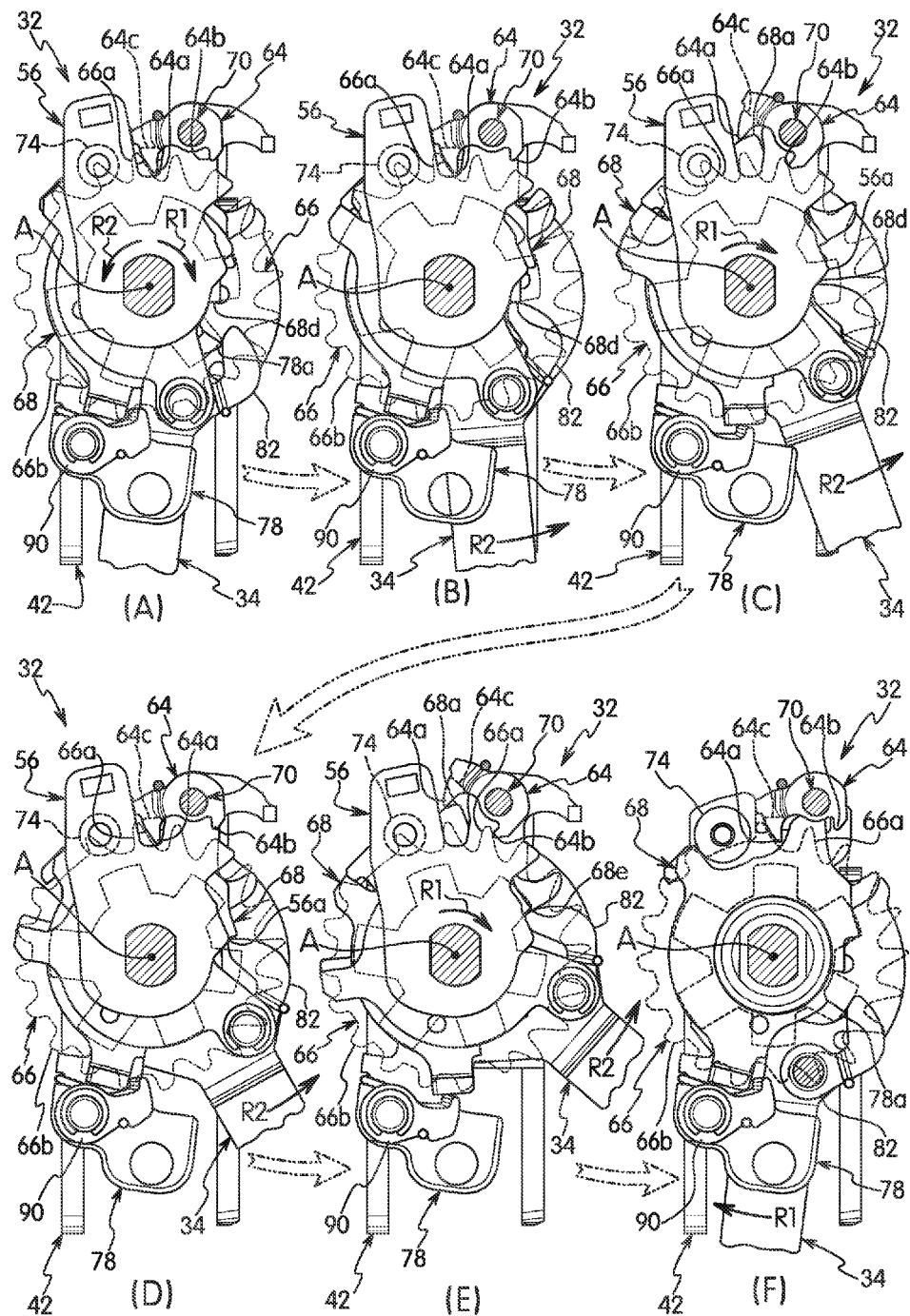
FIG. 11 is a series of front views of selected parts of the control unit of the bicycle control device illustrated in FIGS. 7 to 9, as viewed along the main axle, and showing a release operation of the rotatable member.

Turning now to FIGS. 11 to 35, a releasing operation of the rotatable member 60 using the first operating member 34 will now be discussed. FIG. 11 illustrates sequences for operation of the first operating member 34 from the rest position to a fully operated position in a single progressive operation of the first operating member 34 and then the first operating member 34 returning back to the rest position. FIGS. 12 to 15 correspond to the first operating member 34 in the rest position as seen in part (A) of FIG. 11. FIGS. 16 to 19 correspond to the partially operated position of the first operating member 34 as seen in part (B) of FIG. 11. FIGS. 20 to 23 correspond to the first operated position of the first operating member 34 as seen in part (C) of FIG. 11. FIGS. 24 to 27 correspond to the second operated position of the first operating member 34 as seen in part (D) of FIG. 11. FIGS. 28 to 31 correspond to the third operated position of the first operating member 34 as seen in part (E) of FIG. 11. FIGS. 32 to 35 correspond to the first operating member 34 being returned back to the rest position after two release operations as seen in part (F) of FIG. 11.

Figure 12:
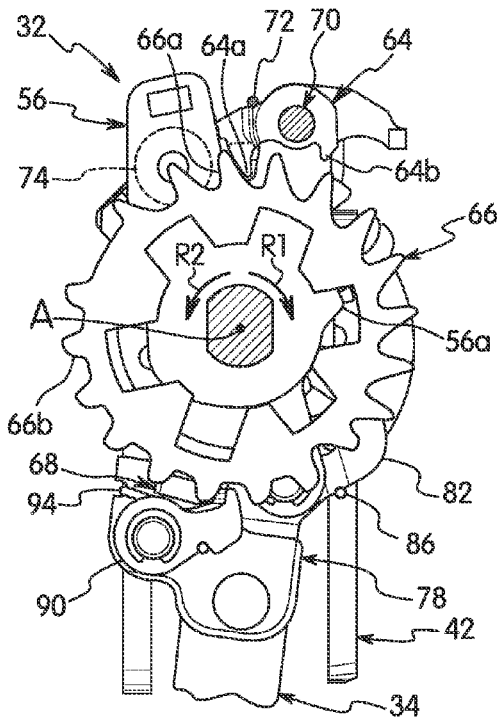
FIG. 12 is a first front view of selected parts of the control unit of the bicycle control device in the rest position as viewed along the main axle.
Figure 13:
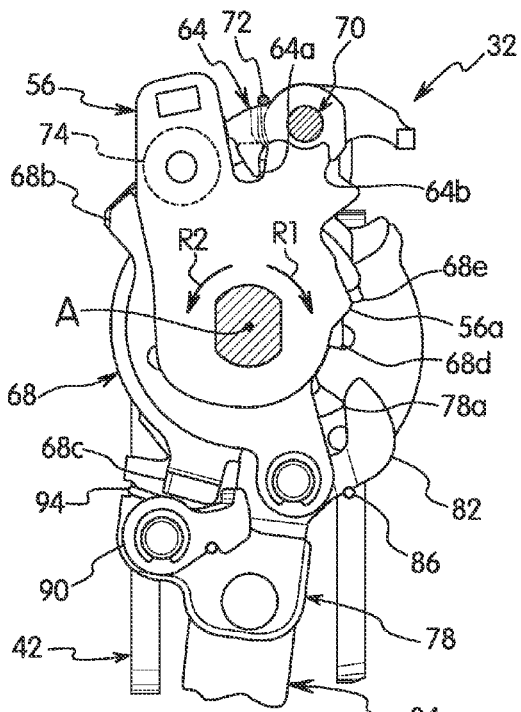
FIG. 13 is a second front view of selected parts of the control unit of the bicycle control device in the rest position as viewed along the main axle, but with selected parts removed with respect to FIG. 12.
Figure 14:
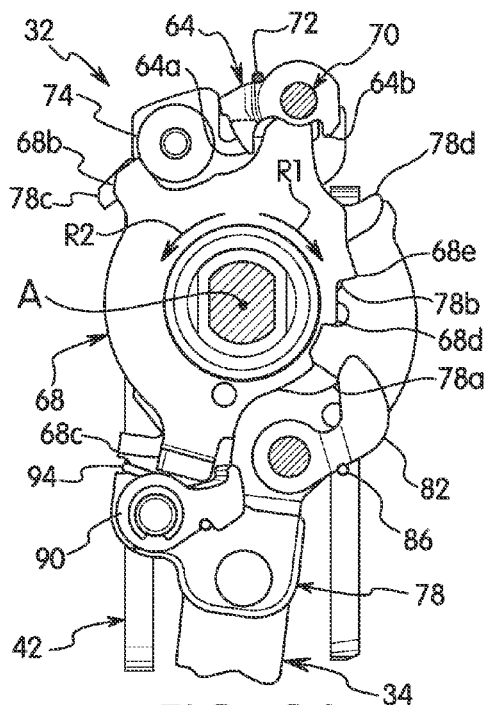
FIG. 14 is a third front view of selected parts of the control unit of the bicycle control device in the rest position as viewed along the main axle, but with selected parts removed with respect to FIG. 13.
Figure 15:
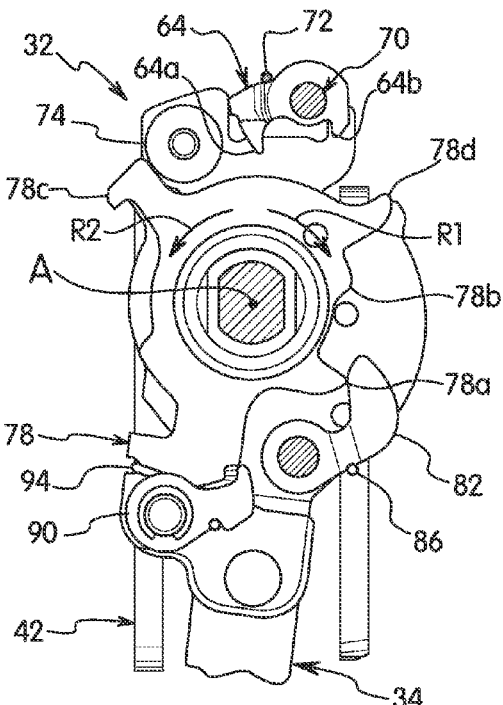
FIG. 15 is a fourth front view of selected parts of the control unit of the bicycle control device in the rest position as viewed along the main axle, but with selected parts removed with respect to FIG. 14.
Figure 16:
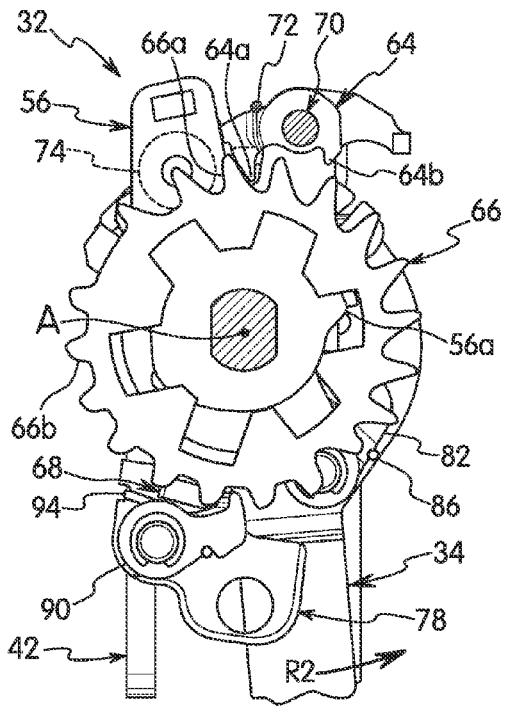
FIG. 16 is a first front view of selected parts of the control unit of the bicycle control device with the first operating member in the partially operated position in which the engaging member (i.e., the release pawl) is engaged with the first abutment of the release member and in which the release member is in the non-releasing position.
Figure 17:
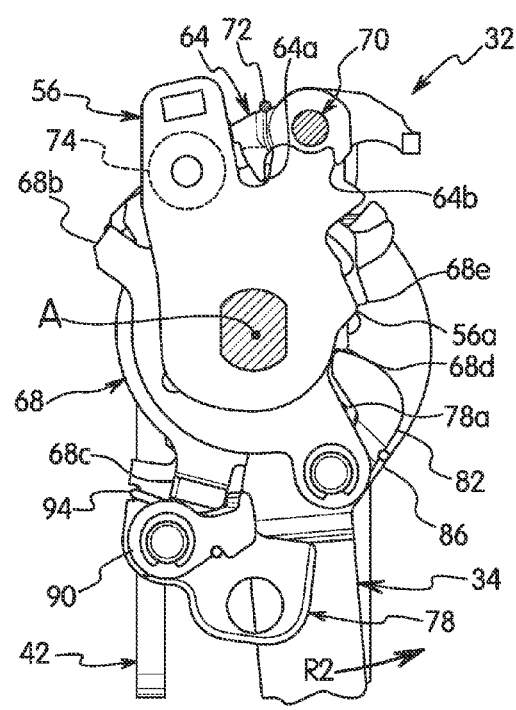
FIG. 17 is a second front view of selected parts of the control unit of the bicycle control device with the first operating member in the partially operated position in which the release pawl is engaged with the first abutment of the release member and in which the release member is in the non-releasing position, but with selected parts removed with respect to FIG. 16.
Figure 18:
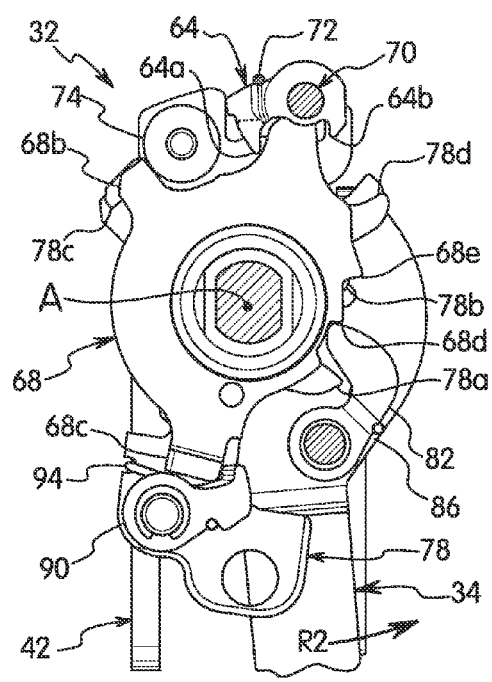
FIG. 18 is a third front view of selected parts of the control unit of the bicycle control device with the first operating member in the partially operated position in which the release pawl is engaged with the first abutment of the release member and in which the release member is in the non-releasing position, but with selected parts removed with respect to FIG. 17.
Figure 19:
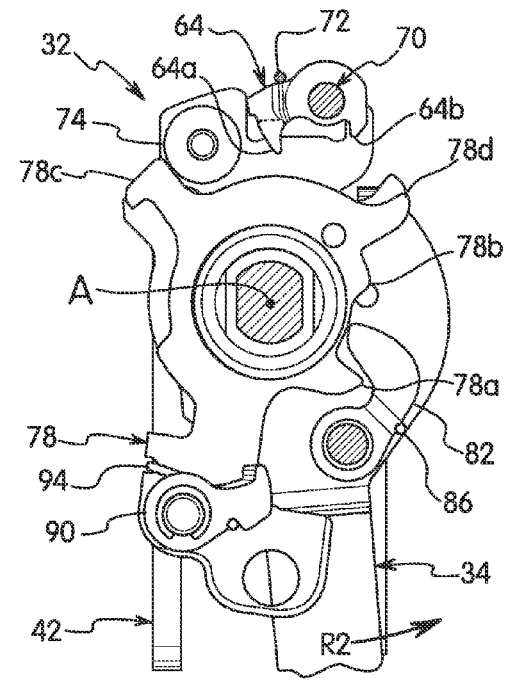
FIG. 19 is a fourth front view of selected parts of the control unit of the bicycle control device with the first operating member in the partially operated position in which the release pawl is engaged with the first abutment of the release member and in which the release member is in the non-releasing position, but with selected parts removed with respect to FIG. 18.
Figure 24:
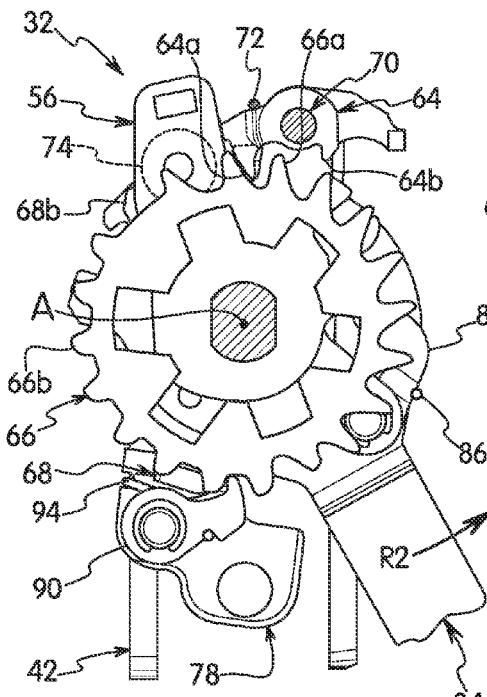
FIG. 24 is a first front view of selected parts of the control unit of the bicycle control device with the first operating member in the second operated position in which the engaging member (i.e., the release pawl) is disengaged from the release member and in which the release member is in the non-releasing position.
Figure 25:
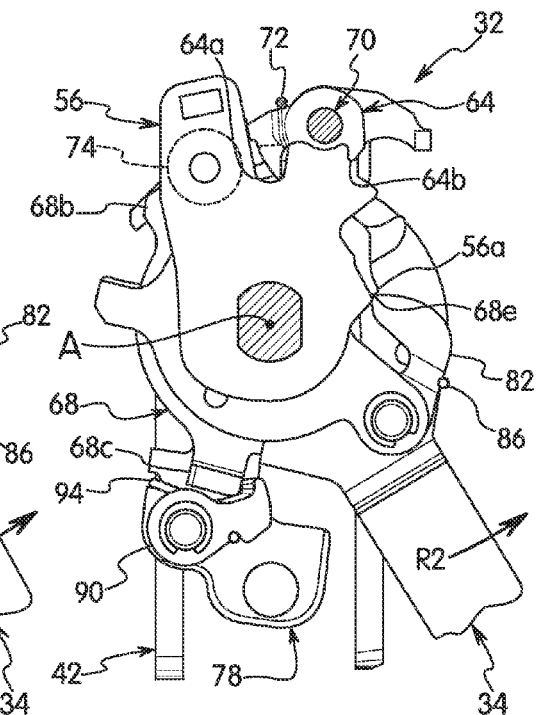
FIG. 25 is a second front view of selected parts of the control unit of the bicycle control device with the first operating member in the second operated position in which the release pawl is disengaged from the release member and in which the release member is in the non-releasing position, but with selected parts removed with respect to FIG. 24.

As seen in part (A) of FIG. 11 and FIGS. 12 to 15, with the control unit 32 in the rest position, the position maintaining tooth 64a of the positioning member 64 is engaged with one of the positioning teeth 66a to establish a current position of the predetermined positions as best seen in FIG. 12. As best seen in FIG. 14, the release member 68 is in the non-releasing position. As best seen in FIG. 15, the engaging member 82 is held out of engagement from the release member 68 by the first disengaging abutment 78a of the attachment plate 78. Also in the rest position, the pulling pawl 90 is in the path of the pulling teeth 66b of the pulling member 66 but not engaged with one of the pulling teeth 66b. The pulling pawl 90 is biased against the release member 68 in the rest position as best seen in FIG. 14.

Referring now to part (B) of FIG. 11 and FIGS. 16 to 19, here, the first operating member 34 has moved in the second direction R2 to the initially operated position. In this initially operated position, the engaging member 82 (i.e., the release pawl) is moved by the first operating member 34 so that the engaging member 82 engages the first abutment 68d of the release member 68. In other words, the engaging member 82 has just contacted the first abutment 68d and has not moved the release member 68. Thus, the release member 68 is still in the non-releasing position.

Referring now to part (C) of FIG. 11 and FIGS. 20 to 23, here, the first operating member 34 has moved farther in the second direction R2 to the first operated position. In other words, the engaging member 82 engages the first abutment 68d as the first operating member 34 is operated from the rest position to the first operated position to rotate the release member 68 in the second direction R2. In this the first operated position, the release member 68 has now been moved from the non-releasing position to the releasing position. With the release member 68 in the releasing position, the release abutment 68a holds the positioning member 64 such that position maintaining tooth 64a disengages from the positioning teeth 66a of the pulling member 66. Also with the release member 68 in the releasing position, the release abutment 68a holds the positioning member 64 such that the stop tooth 64b moves into the path of the positioning teeth 66a of the pulling member 66 to limit rotational movement of the rotatable member 60 by catching one of the positioning teeth 66a of the pulling member 66. Thus, in a single progressive operation of the first operating member 34 in the second direction R2 without moving in the first direction R1, the release member 68 moves from the non-releasing position to the releasing position as the first operating member 34 moves from the rest position towards the first operated position. As a result of the operation, the release abutment 68a of the release member 68 contacts the actuation abutment 64c of the positioning member 64 and pivots the positioning member 64 to disengage the position maintaining tooth 64a from the positioning teeth 66a of the pulling member 66. In this way, an instant release operation occurs without moving in the first direction R1.

Figure 26:
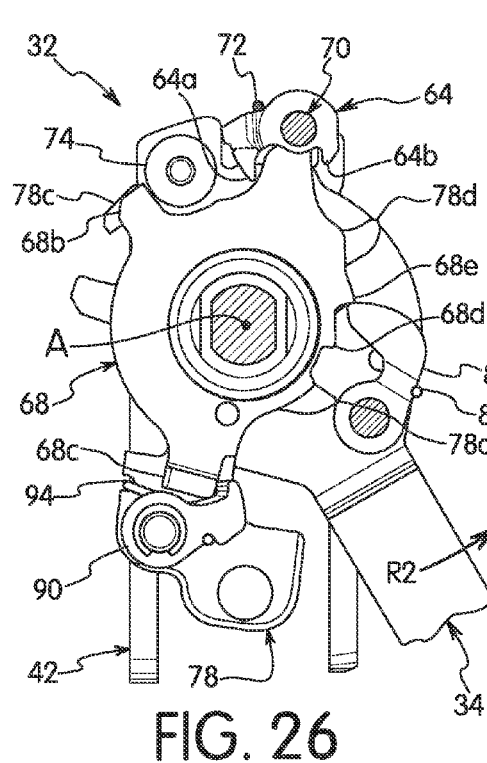
FIG. 26 is a third front view of selected parts of the control unit of the bicycle control device with the first operating member in the second operated position in which the release pawl is disengaged from the release member and in which the release member is in the non-releasing position, but with selected parts removed with respect to FIG. 25.
Figure 27:
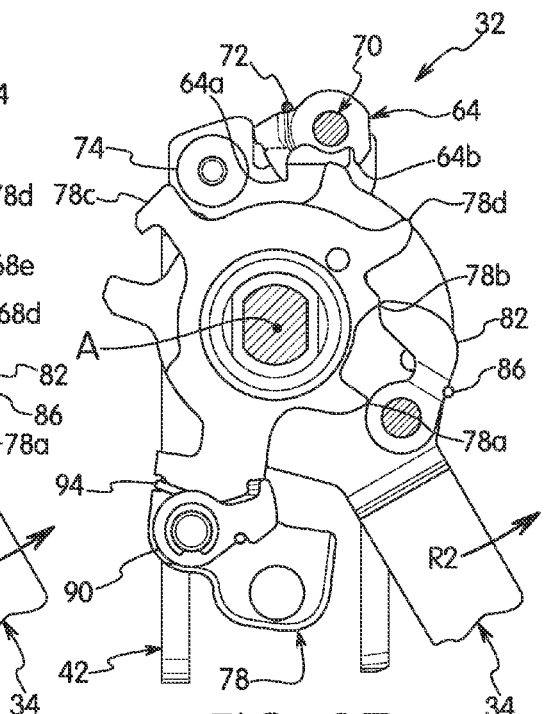
FIG. 27 is a fourth front view of selected parts of the control unit of the bicycle control device with the first operating member in the second operated position in which the release pawl is disengaged from the release member and in which the release member is in the non-releasing position, but with selected parts removed with respect to FIG. 26.
Figure 28:
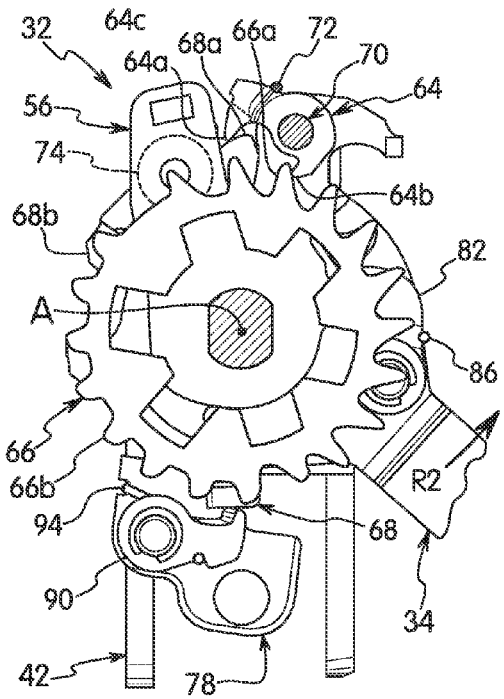
FIG. 28 is a first front view of selected parts of the control unit of the bicycle control device with the first operating member in the third operated position in which the engaging member (i.e., the release pawl) is engaged with the second abutment of the release member and in which the release member is in the releasing position.
Figure 29:
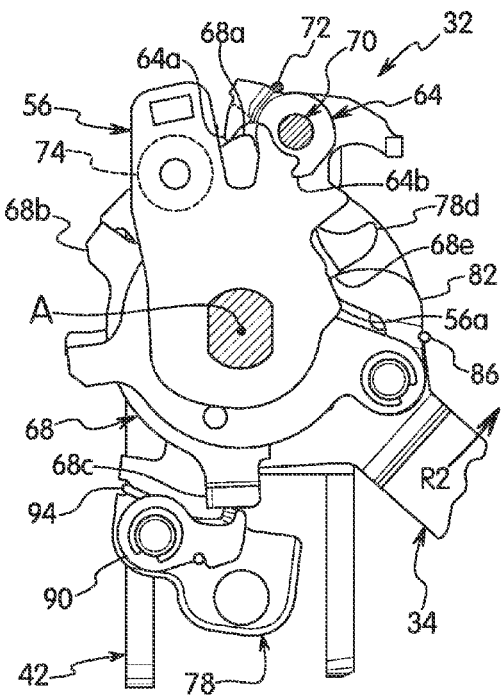
FIG. 29 is a second front view of selected parts of the control unit of the bicycle control device with the first operating member in the third operated position in which the release pawl is engaged with the second abutment of the release member and in which the release member is in the releasing position, but with selected parts removed with respect to FIG. 28.
Figure 30:
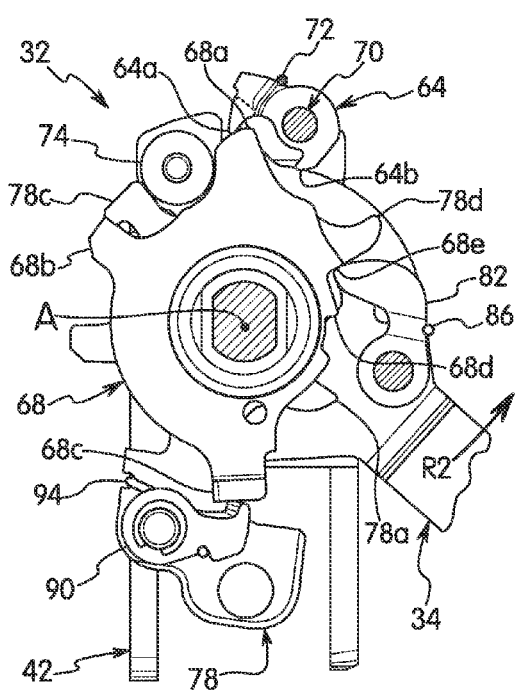
FIG. 30 is a third front view of selected parts of the control unit of the bicycle control device with the first operating member in the third operated position in which the release pawl is engaged with the second abutment of the release member and in which the release member is in the releasing position, but with selected parts removed with respect to FIG. 29.
Figure 31:
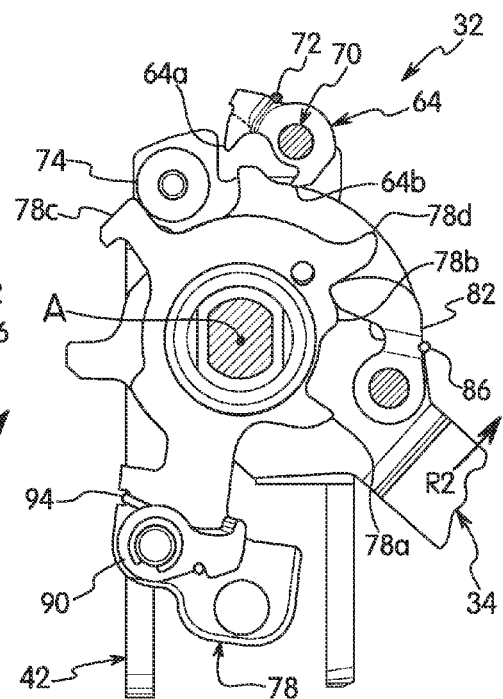
FIG. 31 is a fourth front view of selected parts of the control unit of the bicycle control device with the first operating member in the third operated position in which the engaging member (i.e., the release pawl) is engaged with the second abutment of the release member and in which the release member is in the releasing position, but with selected parts removed with respect to FIG. 30.
Figure 32:
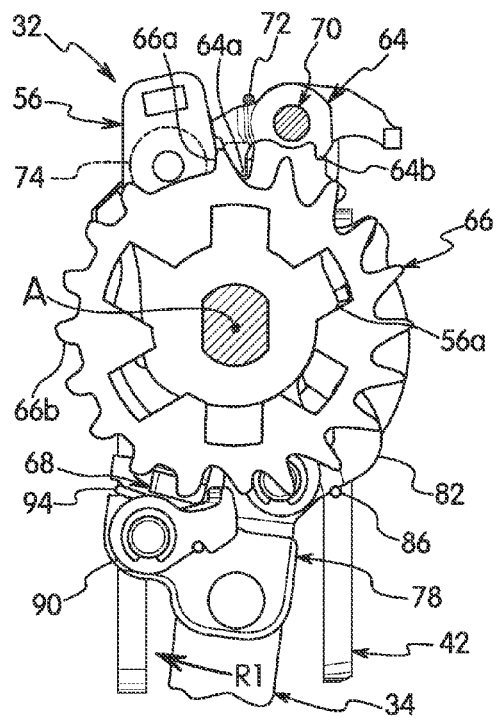
FIG. 32 is a first front view of selected parts of the control unit of the bicycle control device with the first operating member in the rest position in which the engaging member (i.e., the release pawl) is disengaged from the release member and in which the release member is in the non-releasing position.
Figure 33:
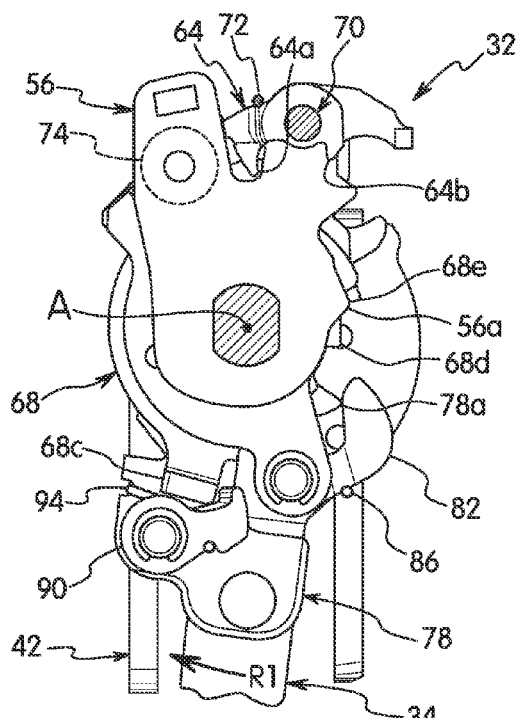
FIG. 33 is a second front view of selected parts of the control unit of the bicycle control device with the first operating member in the rest operated position in which the release pawl is disengaged from the release member and in which the release member is in the non-releasing position, but with selected parts removed with respect to FIG. 32.
Figure 34:
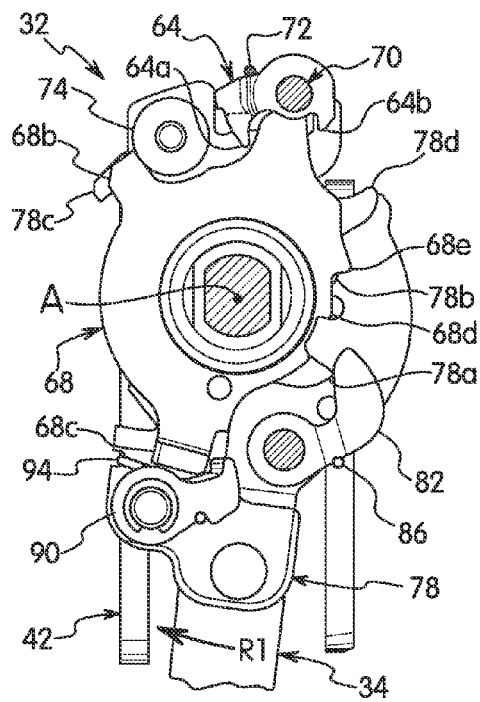
FIG. 34 is a third front view of selected parts of the control unit of the bicycle control device with the first operating member in the rest operated position in which the release pawl is disengaged from the release member and in which the release member is in the non-releasing position, but with selected parts removed with respect to FIG. 33.
Figure 35:
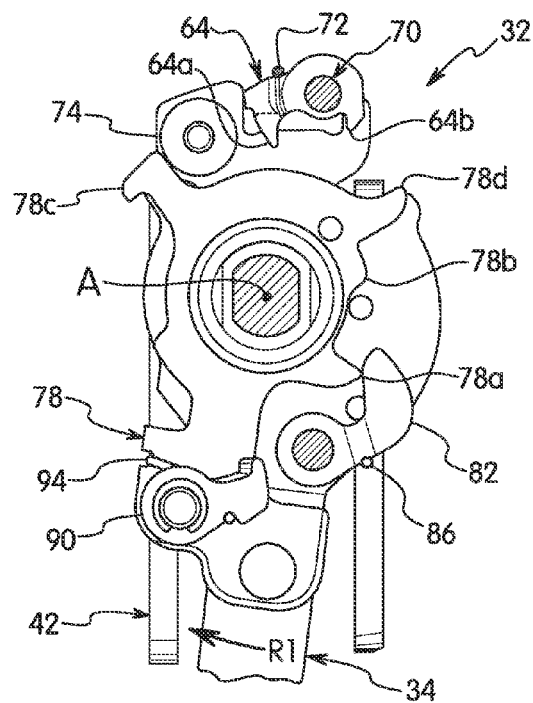
FIG. 35 is a fourth front view of selected parts of the control unit of the bicycle control device with the first operating member in the rest operated position in which the release pawl is disengaged from the release member and in which the release member is in the non-releasing position, but with selected parts removed with respect to FIG. 34.

Referring now to part (D) of FIG. 11 and FIGS. 24 to 27, here, the first operating member 34 has moved farther in the second direction R2 to the second operated position such that the release member 68 is released to rotate back in the first direction R1, from the releasing position to the non-releasing position. In other words, the engaging member 82 is disengaged from the first abutment 68d to release the release member 68 for rotation in the first direction R1 due to the biasing member 76. In particular, this further operation of the first operating member 34 causes the engaging member 82 ride along the edges of the second stationary support plate 56 and the attachment plate 78 to engage the disengaging abutments 56a and 78b. In other words, the engaging member 82 contacts the disengaging abutments 56a and 78b such that the disengaging abutments 56a and 78b moves the engaging member 82 to a disengaged position with respect to the release member 68 as the first operating member 34 is operated from the first operated position to the second operated position. The disengaging abutments 56a and 78b are aligned in the axially direction of the control unit 32 to pivot the engaging member 82 out of engagement of the first abutment 68d. Now, as seen in FIG. 26, the engaging member 82 is now ready to engage the second abutment 68e. The second operated position as seen in part (D) of FIG. 11 and FIGS. 24 to 27 is farther from the rest position than the first operated position part (C) of FIG. 11 and FIGS. 20 to 23. Thus, in a single progressive operation of the first operating member 34 from the rest position without moving in the first direction R1, the release member 68 has now moved from the releasing position back to the non-releasing position as the first operating member 34 moves from the first operated position towards the second operated position.

Referring now to part (E) of FIG. 11 and FIGS. 28 to 31, here, the first operating member 34 has moved farther in the second direction R2 to the third operated position. Obviously, the third operated position is farther from the rest position than the second operated position. As a result of this farther movement, the engaging member 82 engages the second abutment 68e as the first operating member 34 is operated from the second operated position to the third operated position to rotate the release member 68 in the second direction R2. In this the third operated position, the release member 68 has now been moved from the non-releasing position to the releasing position for a second time in a single progressive operation of the first operating member 34 from the rest position without moving in the first direction R1. Again with the release member 68 in the releasing position, the release abutment 68a holds the positioning member 64 such that the position maintaining tooth 64a disengages from the positioning teeth 66a of the pulling member 66. Also with the release member 68 in the releasing position, the release abutment 68a holds the positioning member 64 such that the stop tooth 64b moves into the path of the positioning teeth 66a of the pulling member 66 to limit rotational movement of the rotatable member 60 by catching one of the positioning teeth 66a of the pulling member 66. Thus, in a single progressive operation of the first operating member 34 in the second direction R2 without moving in the first direction R1, the release member 68 moves from the non-releasing position to the releasing position as the first operating member 34 moves from the second operated position towards the third operated position. As a result of the operation, the release abutment 68a of the release member 68 contacts the actuation abutment 64c of the positioning member 64 and pivots the positioning member 64 to disengage the position maintaining tooth 64a from the positioning teeth 66a of the pulling member 66. Thus, in a single progressive operation of the first operating member 34 from the rest position, the release member 68 has now moved from the non-releasing position to the releasing position as the first operating member 34 moves from the second operated position towards the third operated position.

Referring now to part (F) of FIG. 11 and FIGS. 32 to 35, here, the first operating member 34 has been moved in the first direction R1 to return to the rest position such that the parts of the control unit 32 are again in the rest position. However, the rotatable member 60 and the pulling member 66 have been rotated by two of the predetermined positions from the predetermined position of the rotatable member 60 and the pulling member 66 as shown in part (A) of FIG. 11 and FIGS. 12 to 15

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle control device. Accordingly, these terms, as utilized to describe the bicycle control device should be interpreted relative to a bicycle equipped with the bicycle control device as used in the normal riding position on a horizontal surface. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device comprising:
a fixed member;
a first operating member movably arranged with respect to the fixed member;
a rotatable member rotatably mounted to the fixed member in a first rotational direction and a second rotational direction being opposite to the first rotational direction;
a positioning member movably arranged with respect to the fixed member to selectively hold the rotatable member in a plurality of predetermined positions;
a release member movably arranged with respect to the fixed member between a non-releasing position and a releasing position, and moving the positioning member to release the rotatable member for movement from a current one of the predetermined positions in response to operation of the first operating member; and
an engaging member operatively coupled to the first operating member to engage the release member such that the engaging member moves the release member as the first operating member is operated from the rest position,
in a single progressive operation of the first operating member, the release member moves from the non-releasing position to the releasing position as the first operating member moves from a rest position towards a first operated position, the release member moves from the releasing position to the non-releasing position as the first operating member moves from the first operated position towards a second operated position, and the release member moves from the non-releasing position to the releasing position as the first operating member moves from the second operated position towards a third operated position, the second operated position is farther from the rest position than the first operated position, the third operated position is farther from the rest position than the second operated position.

2. The bicycle control device according to claim 1, further comprising
a biasing member biasing the rotatable member to the first rotational direction.

3. The bicycle control device according to claim 1, wherein the release member has a first abutment and a second abutment, and
the engaging member engages the first abutment as the first operating member is operated from the rest position to the first operated position, and the engaging member engages the second abutment as the first operating member is operated from the second operated position to the third operated position.

4. The bicycle control device according to claim 1, wherein the fixed member has a disengaging abutment, and
the engaging member is movably mounted on the first operating member, and the engaging member contacts the disengaging abutment such that the disengaging abutment moves the engaging member to a disengaged position with respect to the release member as the first operating member is operated from the first operated position to the second operated position.

5. The bicycle control device according to claim 1, wherein the rotatable member and the release member are rotatably mounted to the fixed member on a first axis.

6. The bicycle control device according to claim 5, wherein the first operating member is pivotally mounted to the fixed member on the first axis.

7. The bicycle control device according to claim 1, further comprising
a second operating member movably arranged with respect to the fixed member, and operatively engaged the rotatable member to rotate the rotatable member in the second rotational direction as the second operating member is operated from a rest position.

8. The bicycle control device according to claim 7, wherein
the engaging member is a release pawl that is pivotally mounted on the first operating member, and
the second operating member has a pulling pawl that operatively engages the rotatable member.

9. The bicycle control device according to claim 8, further comprising
a pulling member coupled to the rotatable member as an integrated unit that is rotatably mounted to the fixed member on a first axis, the pulling member has a plurality of puling teeth, the pulling pawl engages one of the plurality of pulling teeth.

10. The bicycle control device according to claim 9, wherein
the first and second operating members are both pivotally operated from their rest positions in a same direction.

* * * * *